Sept. 24, 1957       A. O. JANSSON       2,807,069
FASTENING DEVICE
Filed Sept. 28, 1953
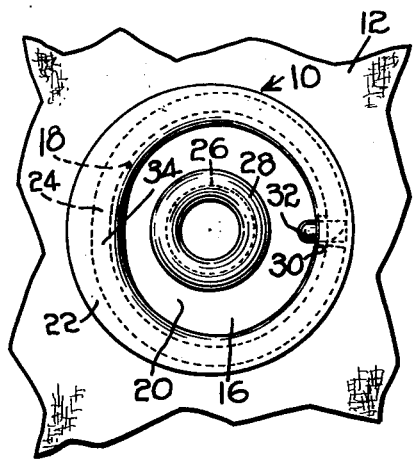
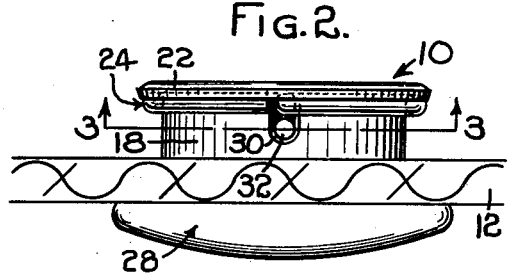
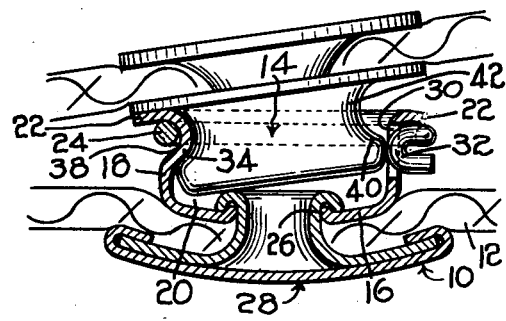
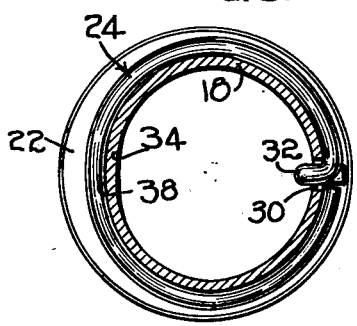
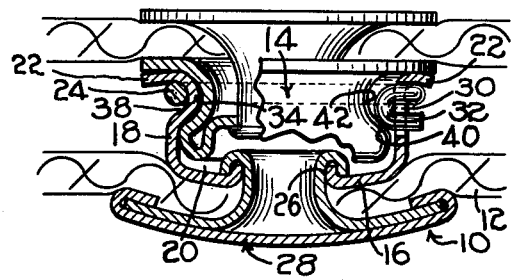
INVENTOR:
ARNOLD O. JANSSON,
BY Robert E Ross
ATTORNEY.

United States Patent Office 2,807,069
Patented Sept. 24, 1957

2,807,069

FASTENING DEVICE

Arnold O. Jansson, Arlington, Mass., assignor, by mesne assignments, to United-Carr Fastener Corporation, Boston, Mass., a corporation of Delaware Application September 28, 1953, Serial No. 382,580

1 Claim. (Cl. 24—218)

This invention relates generally to fastening devices and has particular reference to a snap fastener socket member of the three-side-lock type.

Previously known snap fastener sockets of this general type, in which an expansible spring is encased in a housing to receive a shouldered stud, have been found to have a serious disadvantage, particularly when used on military clothing and military equipment, in that when such fasteners become coated or impregnated with dirt, mud, sand, or the like, they are rendered inoperative. This is particularly troublesome when a stud and socket assembly becomes coated or saturated with wet mud which is allowed to dry. In such cases, it has been found impossible to unsnap the stud from the socket, due to the mud which becomes lodged between the spring and the casing, preventing the expansion of the spring necessary to permit it to pass over the head of the stud.

The object of the invention is to provide a snap fastener socket which is not rendered inoperative by the presence therein of mud, sand, or the like.

A further object of the invention is to provide a snap fastener socket in which an exterior spring has an end portion projecting through an aperture in the side wall of the socket for snapping engagement with an inserted stud.

Other objects of the invention will in part, be obvious, and will, in part, appear hereinafter.

In the drawing:

Fig. 1 is a top plan view of a snap fastener socket embodying the features of the invention;

Fig. 2 is a view of the socket of Fig. 1 as seen from the right side;

Fig. 3 is a view in section taken on line 3—3 of Fig. 1;

Fig. 4 is a view in section of the socket illustrating the method of assembling a stud therein; and Fig. 5 is a view in section of the socket with a stud assembled therein.

Referring to the drawing, there is illustrated a snap fastener socket 10 for attachment to a supporting sheet 12 to receive and engage a shouldered stud 14.

The socket 10 is of the three-side-lock type, that is, the stud may be disengaged from the socket only by a separating force applied to one predetermined side of the assembly. The socket 10 comprises generally a hollow body formed by a base 16, an upstanding peripheral wall 18 disposed on the base forming a generally cylindrical stud-receiving cavity 20, an outwardly turned flange 22 disposed at the upper end of the wall 18 and a spring member 24 disposed about the wall below the flange.

The base 16 is provided with a central opening 26 to enable the socket to be attached to the sheet 12 by means of a capped rivet 28.

To provide means to enable the socket to receive the stud in snapping engagement, an aperture 30 is provided in the wall on one side of the socket, and the spring member 24, which substantially completely encircles the wall, is provided with an inwardly projecting end portion 32 which is curled back on itself, and extends through the aperture 30 to project into the stud-receiving cavity 20. The aperture 30 is slightly larger than the cross-sectional size of the end portion of the spring 24, so that the end portion 32 is freely movable into and out of the cavity 20, for snapping engagement with an inserted stud as will appear hereinafter.

To impart a three-side-lock feature to the socket, a portion of the socket wall 18 in the side opposite the aperture 30 is embossed inwardly in spaced relation to the base to form an inwardly rounded stud-locking portion 34 which projects into the stud cavity 20, and extends an appreciable distance circumferentially, merging gradually into the socket wall, as is best illustrated in Figs. 1 and 3. The forming of the stud-locking portion 34 provides an exterior recess 38, and the portion of the spring 24 on the side of the socket opposite the end portion 32 is disposed in the recess 38. The spring is retained in position by the end portion 32 being disposed in the aperture and by the opposite portion being disposed in the recess 38, and the flange 22 at the upper end of the wall 18 extends over the spring to provide an improved appearance to the socket and also assists in retaining the spring in position.

The stud 14 is provided with a shoulder 40 and a reduced neck 42, which has a concave outer periphery to generally conform to the shape of the stud-locking portion 34.

The stud is assembled into the socket by tilting the stud to insert the shoulder under the stud-locking portion and then pushing the other side of the stud into the socket so that the stud shoulder snaps past the inwardly projecting end portion 32 of the spring.

The mudproof characteristic of the socket is imparted by the fact that the spring is exposed about its periphery so that outward movement of the end portion 32 to permit the head of the stud to pass into or out of the socket cavity cannot be obstructed by the presence of mud or the like, so that jamming of the stud in the socket is impossible.

Since certain obvious modifications may be made in the device without departing from the scope of the invention, it is intended that all matter contained herein be interpreted in an illustrative and not in a limiting sense.

I claim:

A three-side lock snap fastener socket for receiving in snapping engagement a stud of the type having an enlarged head with an inwardly rounded neck, said socket comprising a hollow body having a base and an upstanding peripheral wall forming a stud receiving cavity and a radially extending flange at the top of the wall, said wall having an inwardly rounded stud locking shoulder projecting into the cavity on one side of the socket which conforms generally to the shape of the stud neck and having an aperture on the opposite side of the socket, said wall having a spring receiving recess on its outside adjacent to said locking shoulder and a spring member disposed about the exterior of the socket wall and having a portion fitting into said recess, said spring substantially completely and closely encircling the wall under the flange and having one end portion bent inwardly, downwardly, and outwardly forming an inwardly projecting stud engaging portion extending through the aperture into the cavity, the innermost end of said stud engaging portion having a rounded end conforming generally to the shape of the inwardly rounded neck portion of the stud for snapping engagement therewith and said spring being held in assembly with said hollow body entirely by portions of the hollow body at the said spring receiving recess and the said aperture.

References Cited in the file of this patent

UNITED STATES PATENTS

| | | |
|---|---|---|
| 352,270 | Shipman | Nov. 8, 1886 |
| 572,735 | Thompson | Dec. 8, 1896 |
| 1,208,601 | Manahan | Dec. 12, 1916 |
| 1,278,799 | Carr | Sept. 10, 1918 |
| 2,523,241 | Van Buren | Sept. 19, 1950 |
| 2,718,044 | Murphy | Sept. 20, 1955 |
| 2,767,454 | Johnson | Oct. 23, 1956 |

FOREIGN PATENTS

| | | |
|---|---|---|
| 16,956 | Great Britain | July 24, 1913 |
| 69,999 | Austria | Sept. 25, 1915 |